United States Patent
Levi et al.

(10) Patent No.: US 11,252,464 B2
(45) Date of Patent: Feb. 15, 2022

(54) REGROUPING OF VIDEO DATA IN HOST MEMORY

(71) Applicant: Mellanox Technologies, Ltd., Yokneam (IL)

(72) Inventors: Dotan David Levi, Kiryat Motzkin (IL); Michael Kagan, Zichron Yaakov (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 16/850,036

(22) Filed: Apr. 16, 2020

(65) Prior Publication Data
US 2020/0245016 A1   Jul. 30, 2020

Related U.S. Application Data

(63) Continuation-in-part of application No. 16/442,581, filed on Jun. 17, 2019, which is a continuation-in-part
(Continued)

(51) Int. Cl.
*H04N 21/00* (2011.01)
*H04N 21/426* (2011.01)
*G06T 1/60* (2006.01)

(52) U.S. Cl.
CPC ......... *H04N 21/42607* (2013.01); *G06T 1/60* (2013.01); *H04N 21/42653* (2013.01)

(58) Field of Classification Search
CPC ..... H04L 29/06; H04L 65/60; H04L 67/2823; H04L 65/4084; H04N 21/23; H04N 21/61;
(Continued)

(56) References Cited

U.S. PATENT DOCUMENTS

| | | | |
|---|---|---|---|
| 4,783,698 A * | 11/1988 | Harney | G09G 5/391 348/390.1 |
| 5,949,441 A * | 9/1999 | Ristau | G09G 5/12 345/533 |

(Continued)

FOREIGN PATENT DOCUMENTS

| | | |
|---|---|---|
| EP | 3151560 A1 | 4/2017 |
| GB | 2547754 A | 8/2017 |

OTHER PUBLICATIONS

Sjoberg et al. (RTP Payload Format and File Storage Format for the Adaptive Multi-Rate (AMR) and Adaptive Multi-Rate Wideband (AMR-WB) Audio Codecs, Network Working Group, Request for Comments: Apr. 2007 (Year: 2007).*
(Continued)

*Primary Examiner* — Frank F Huang
(74) *Attorney, Agent, or Firm* — Kligler & Associates Patent Attorneys Ltd

(57) ABSTRACT

Apparatus for data communications includes a host interface, which is configured to be connected to a bus of a host computer having a processor and a memory. Processing circuitry, which is coupled to the host interface, is configured to receive video data with respect to a sequence of pixels, the video data including data words of more than eight bits per pixel for at least one pixel component of the pixels, and to write the video data, via the host interface, to at least one buffer in the memory while justifying the video data in the memory so that the successive pixels in the sequence are byte-aligned in the at least one buffer.

10 Claims, 3 Drawing Sheets

Related U.S. Application Data of application No. 16/291,023, filed on Mar. 4, 2019, application No. 16/850,036, which is a continuation-in-part of application No. 15/622,094, filed on Jun. 14, 2017, now abandoned.

(60) Provisional application No. 62/695,063, filed on Jul. 8, 2018, provisional application No. 62/726,446, filed on Sep. 4, 2018.

(58) Field of Classification Search
CPC ......... H04N 21/6125; H04N 21/42607; H04N 21/42653; G06T 1/60
See application file for complete search history.

(56) References Cited

U.S. PATENT DOCUMENTS

| | | | |
|---|---|---|---|
| 6,151,360 A | 11/2000 | Kato et al. | |
| 7,733,464 B2* | 6/2010 | David | G02B 23/12 356/5.03 |
| 7,881,496 B2* | 2/2011 | Camilleri | B60R 1/00 382/104 |
| 8,682,108 B2* | 3/2014 | Tian | G06K 9/3233 382/294 |
| 8,693,551 B2 | 4/2014 | Zheludkov et al. | |
| 9,131,235 B2 | 9/2015 | Zheludkov et al. | |
| 9,270,299 B2* | 2/2016 | Luby | H04L 1/0083 |
| 9,367,746 B2* | 6/2016 | Ishihara | G06K 9/00724 |
| 9,451,266 B2 | 9/2016 | Zheludkov et al. | |
| 9,767,529 B1* | 9/2017 | Liu | H04N 19/426 |
| 10,200,719 B2 | 2/2019 | Zhang et al. | |
| 2002/0041089 A1* | 4/2002 | Yasui | B60R 21/01556 280/735 |
| 2004/0146203 A1* | 7/2004 | Yoshimura | G08B 13/187 382/218 |
| 2004/0165091 A1* | 8/2004 | Takemura | H04N 5/2355 348/296 |
| 2006/0017843 A1 | 1/2006 | Shi et al. | |
| 2006/0129909 A1 | 6/2006 | Butt et al. | |
| 2006/0180670 A1* | 8/2006 | Acosta | G06K 7/12 235/462.31 |
| 2007/0110160 A1 | 5/2007 | Wang et al. | |
| 2007/0211157 A1* | 9/2007 | Humpoletz | G01J 5/22 348/333.01 |
| 2007/0296849 A1* | 12/2007 | Sano | H04N 5/2355 348/362 |
| 2008/0126278 A1 | 5/2008 | Bronstein et al. | |
| 2009/0021612 A1* | 1/2009 | Hamilton, Jr | H04N 9/04559 348/249 |
| 2009/0074079 A1 | 3/2009 | Lee et al. | |
| 2009/0153699 A1* | 6/2009 | Satoh | H04N 5/35581 348/229.1 |
| 2009/0244288 A1* | 10/2009 | Fujimoto | H04N 5/235 348/164 |
| 2010/0002770 A1 | 1/2010 | Motta et al. | |
| 2010/0149393 A1* | 6/2010 | Zarnowski | H04N 5/3537 348/302 |
| 2010/0226438 A1 | 9/2010 | Saunders et al. | |
| 2010/0265316 A1* | 10/2010 | Sali | H04N 13/254 348/46 |
| 2011/0268194 A1* | 11/2011 | Nagano | H04N 19/70 375/240.25 |
| 2011/0283156 A1 | 11/2011 | Hiie | |
| 2012/0020413 A1* | 1/2012 | Chen | H04N 21/84 375/240.26 |
| 2012/0033039 A1* | 2/2012 | Sasaki | H04N 13/161 348/43 |
| 2012/0044990 A1 | 2/2012 | Bivolarsky et al. | |
| 2012/0281924 A1 | 11/2012 | Coulombe et al. | |
| 2013/0101039 A1 | 4/2013 | Florencio | |
| 2013/0163674 A1 | 6/2013 | Zhang | |
| 2013/0208795 A1 | 8/2013 | Xu et al. | |
| 2013/0265388 A1 | 10/2013 | Zhang et al. | |
| 2013/0301727 A1 | 11/2013 | Huang et al. | |
| 2013/0322753 A1* | 12/2013 | Lim | G06T 5/50 382/167 |
| 2013/0329006 A1* | 12/2013 | Boles | G06K 9/2018 348/42 |
| 2014/0161188 A1 | 6/2014 | Zhang et al. | |
| 2015/0026542 A1 | 1/2015 | Brennum | |
| 2016/0080755 A1 | 3/2016 | Toma et al. | |
| 2016/0100186 A1 | 4/2016 | Gisquet et al. | |
| 2016/0286232 A1 | 9/2016 | Li et al. | |
| 2017/0171167 A1 | 6/2017 | Suzuki | |
| 2018/0098070 A1 | 4/2018 | Chuang et al. | |
| 2018/0124418 A1 | 5/2018 | Van Leuven et al. | |
| 2018/0316929 A1 | 11/2018 | Li et al. | |
| 2018/0343448 A1 | 11/2018 | Possos et al. | |
| 2018/0359483 A1 | 12/2018 | Chen et al. | |
| 2018/0376160 A1 | 12/2018 | Zhang et al. | |
| 2019/0058882 A1 | 2/2019 | Hinz et al. | |
| 2019/0110058 A1 | 4/2019 | Chien et al. | |
| 2019/0158882 A1 | 5/2019 | Chen et al. | |
| 2019/0188829 A1 | 6/2019 | Wei | |
| 2019/0230376 A1 | 7/2019 | Hu et al. | |
| 2019/0327484 A1 | 10/2019 | Grange et al. | |
| 2020/0014918 A1 | 1/2020 | Levi et al. | |
| 2020/0014945 A1 | 1/2020 | Levi et al. | |
| 2020/0076521 A1 | 3/2020 | Hammond | |
| 2020/0077116 A1 | 3/2020 | Lee et al. | |

OTHER PUBLICATIONS

De Rivaz et al., "AV1 Bitstream & Decoding Process Specification", pp. 1-681, Jan. 8, 2019.

Grange et al., "A VP9 Bitstream Overview draft-grange-vp9-bitstream-00", Network Working Group, pp. 1-14, Feb. 18, 2013.

ITU-T Recommendation H.264., "Series H: Audiovisual and Multimedia Systems: Infrastructure of audiovisual services—Coding of moving video; Advanced video coding for generic audiovisual services", pp. 1-282, May 2003.

ITU-T Recommendation H.265., "Series H: Audiovisual and Multimedia Systems: Infrastructure of audiovisual services—Coding of moving video; High efficiency video coding", pp. 1-634, Apr. 2015.

Wikipedia., 'Versatile Video Coding', pp. 1-5, Feb. 22, 2019 (https://en.wikipedia.org/w/index.php?title=Versatile_Video_Coding&oldid=884627637).

Main Concept, "MainConcept Accelerates HEVC Encoding with NVIDIA RTX GPUs", newsletter, pp. 1-4, Apr. 8, 2019 downloaded from https://www.mainconcept.com/company/news/news-article/article/mainconcept-accelerates-hevc-encoding-with-nvidia-rtx-gpus.html.

U.S. Appl. No. 16/291,023 Office Action dated Nov. 20, 2020.
U.S. Appl. No. 16/442,581 Office Action dated Nov. 30, 2020.
U.S. Appl. No. 16/693,302 Office Action dated Feb. 19, 2021.
U.S. Appl. No. 16/442,581 Office Action dated Jun. 23, 2021.
U.S. Appl. No. 16/291,023 Office Action dated Jun. 24, 2021.
U.S. Appl. No. 17/095,765 Office Action dated Dec. 6, 2021.

* cited by examiner

FIG. 3 (80)

| | | |
|---|---|---|
| 47 | Y1[0] | ⎫ |
| 46 | Y1[1] | |
| 45 | Y1[2] | |
| 44 | Y1[3] | |
| 43 | Y1[4] | |
| 42 | Y1[5] | ⎬ 84 |
| 41 | Y1[6] | |
| 40 | Y1[7] | |
| 39 | Y1[8] | |
| 38 | Y1[9] | |
| 37 | Y1[10] | |
| 36 | Y1[11] | ⎭ |
| 35 | Cr0[0] | ⎫ |
| 34 | Cr0[1] | |
| 33 | Cr0[2] | |
| 32 | Cr0[3] | |
| 31 | Cr0[4] | |
| 30 | Cr0[5] | ⎬ 82 |
| 29 | Cr0[6] | |
| 28 | Cr0[7] | |
| 27 | Cr0[8] | |
| 26 | Cr0[9] | |
| 25 | Cr0[10] | |
| 24 | Cr0[11] | ⎭ |
| 23 | Y0[0] | ⎫ |
| 22 | Y0[1] | |
| 21 | Y0[2] | |
| 20 | Y0[3] | |
| 19 | Y0[4] | |
| 18 | Y0[5] | ⎬ 84 |
| 17 | Y0[6] | |
| 16 | Y0[7] | |
| 15 | Y0[8] | |
| 14 | Y0[9] | |
| 13 | Y0[10] | |
| 12 | Y0[11] | ⎭ |
| 11 | Cb0[0] | ⎫ |
| 10 | Cb0[1] | |
| 9 | Cb0[2] | |
| 8 | Cb0[3] | |
| 7 | Cb0[4] | |
| 6 | Cb0[5] | ⎬ 82 |
| 5 | Cb0[6] | |
| 4 | Cb0[7] | |
| 3 | Cb0[8] | |
| 2 | Cb0[9] | |
| 1 | Cb0[10] | |
| 0 | Cb0[11] | ⎭ |

FIG. 4A (58)

| | | |
|---|---|---|
| 47 | Y3[0] | ⎫ 98 |
| 46 | Y3[1] | ⎭ |
| 45 | Y2[0] | ⎫ 98 |
| 44 | Y2[1] | ⎭ ⎫ 96 |
| 43 | Y1[0] | ⎫ 98 |
| 42 | Y1[1] | ⎭ |
| 41 | Y0[0] | ⎫ 98 |
| 40 | Y0[1] | ⎭ |
| 39 | Y3[2] | ⎫ 94 |
| 38 | Y3[3] | ⎭ |
| 37 | Y2[2] | ⎫ 94 ⎬ 92 |
| 36 | Y2[3] | ⎭ |
| 35 | Y1[2] | ⎫ 94 |
| 34 | Y1[3] | ⎭ |
| 33 | Y0[2] | ⎫ 94 |
| 32 | Y0[3] | ⎭ |
| 31 | Y3[4] | ⎫ |
| 30 | Y3[5] | |
| 29 | Y3[6] | |
| 28 | Y3[7] | |
| 27 | Y3[8] | ⎬ 90 |
| 26 | Y3[9] | |
| 25 | Y3[10] | |
| 24 | Y3[11] | ⎭ |
| 23 | Y2[4] | ⎫ |
| 22 | Y2[5] | |
| 21 | Y2[6] | |
| 20 | Y2[7] | |
| 19 | Y2[8] | ⎬ 90 |
| 18 | Y2[9] | |
| 17 | Y2[10] | |
| 16 | Y2[11] | ⎭ |
| 15 | Y1[4] | ⎫ |
| 14 | Y1[5] | |
| 13 | Y1[6] | |
| 12 | Y1[7] | |
| 11 | Y1[8] | ⎬ 90 |
| 10 | Y1[9] | |
| 9 | Y1[10] | |
| 8 | Y1[11] | ⎭ |
| 7 | Y0[4] | ⎫ |
| 6 | Y0[5] | |
| 5 | Y0[6] | |
| 4 | Y0[7] | |
| 3 | Y0[8] | ⎬ 90 |
| 2 | Y0[9] | |
| 1 | Y0[10] | |
| 0 | Y0[11] | ⎭ |

FIG. 4B (60)

| | | |
|---|---|---|
| 47 | Cr2[0] | ⎫ |
| 46 | Cr2[1] | |
| 45 | Cb2[0] | |
| 44 | Cb2[1] | ⎬ 104 |
| 43 | Cr0[0] | |
| 42 | Cr0[1] | |
| 41 | Cb0[0] | |
| 40 | Cb0[1] | ⎭ |
| 39 | Cr2[2] | ⎫ |
| 38 | Cr2[3] | |
| 37 | Cb2[2] | |
| 36 | Cb2[3] | ⎬ 102 |
| 35 | Cr0[2] | |
| 34 | Cr0[3] | |
| 33 | Cb0[2] | |
| 32 | Cb0[3] | ⎭ |
| 31 | Cr2[4] | ⎫ |
| 30 | Cr2[5] | |
| 29 | Cr2[6] | |
| 28 | Cr2[7] | ⎬ 100 |
| 27 | Cr2[8] | |
| 26 | Cr2[9] | |
| 25 | Cr2[10] | |
| 24 | Cr2[11] | ⎭ |
| 23 | Cb2[4] | ⎫ |
| 22 | Cb2[5] | |
| 21 | Cb2[6] | |
| 20 | Cb2[7] | ⎬ 100 |
| 19 | Cb2[8] | |
| 18 | Cb2[9] | |
| 17 | Cb2[10] | |
| 16 | Cb2[11] | ⎭ |
| 15 | Cr0[4] | ⎫ |
| 14 | Cr0[5] | |
| 13 | Cr0[6] | |
| 12 | Cr0[7] | ⎬ 100 |
| 11 | Cr0[8] | |
| 10 | Cr0[9] | |
| 9 | Cr0[10] | |
| 8 | Cr0[11] | ⎭ |
| 7 | Cb0[4] | ⎫ |
| 6 | Cb0[5] | |
| 5 | Cb0[6] | |
| 4 | Cb0[7] | ⎬ 100 |
| 3 | Cb0[8] | |
| 2 | Cb0[9] | |
| 1 | Cb0[10] | |
| 0 | Cb0[11] | ⎭ |

FIG. 3    FIG. 4A    FIG. 4B

REGROUPING OF VIDEO DATA IN HOST MEMORY

CROSS-REFERENCE TO RELATED APPLICATIONS

This application is a continuation-in-part of U.S. patent application Ser. No. 15/622,094, filed Jun. 14, 2017, and of U.S. patent application Ser. No. 16/442,581, filed Jun. 17, 2019, which is a continuation-in-part of U.S. patent application Ser. No. 16/291,023, filed Mar. 4, 2019, which claims the benefit of U.S. Provisional Patent Application 62/695,063, filed Jul. 8, 2018, and U.S. Provisional Patent Application 62/726,446, filed Sep. 4, 2018. The disclosures of all these related applications are incorporated herein by reference.

FIELD OF THE INVENTION

The present invention relates generally to network data communications, and particularly to methods and apparatus for handling streams of video data transmitted over a network.

BACKGROUND

High-speed packet streaming schemes are commonly used in transmitting real-time video across a network. For professional applications, these schemes typically combine multiple pixels of raw (uncompressed) video data into large Internet Protocol (IP) packets. A number of standard protocols have been developed for this purpose. For example, the SMPTE 2022-6:2012 standard, entitled "Transport of High Bit Rate Media Signals over IP Networks (HBRMT)" specifies a format for transport of high bit-rate signals (including uncompressed video at bit rates of 3 Gbps) that are not encapsulated in MPEG-2 transport streams over IP networks using the Real-time Transport Protocol (RTP).

As another example, Request for Comments (RFC) 4175 of the Internet Engineering Task Force (IETF) defines an RTP payload format for uncompressed video. This payload format supports transport of pixel data in both RGB and various YCbCr (luminance/chrominance) formats. For instance, in YCbCr 4:2:2 format video, the Cb and Cr components are horizontally sub-sampled by a factor of two (so that each Cb and Cr sample corresponds to two Y components). Samples are assembled into packets in the order Cb0-Y0-Cr0-Y1, at 8, 10, 12 or 16 bits per sample.

The terms "luminance" and "chrominance" are used in the present description and in the claims to refer generically to component representations of video color space in which light intensity information, or luminance pixel component (often represented by Y or Y'), is separated from color information, or chrominance pixel components (represented, for example, as Cb/Cr, $C_B/C_R$, $P_B/P_R$, or U/V). Although there are some differences in computation of the different sorts of measures of luminance and chrominance and in the terminology used in referring to these measures, the principles of the present invention, as described below, are applicable to all such representations of video data.

SUMMARY

Embodiments of the present invention that are described hereinbelow provide improved methods and apparatus for handling video data in a host computer.

There is therefore provided, in accordance with an embodiment of the invention, apparatus for data communications, including a host interface, which is configured to be connected to a bus of a host computer having a processor and a memory. Processing circuitry, which is coupled to the host interface, is configured to receive video data including interleaved words of luminance data and chrominance data with respect to a sequence of pixels, and to separate the luminance data from the chrominance data and to write the luminance data, via the host interface, to a luminance buffer in the memory while writing the chrominance data, via the host interface, to at least one chrominance buffer in the memory, separate from the luminance buffer.

In a disclosed embodiment, the apparatus includes a network interface, which is configured to receive from a packet communication network data packets containing the video data.

In one embodiment, the chrominance data include Cr component data and Cb component data, and the at least one chrominance buffer includes separate first and second buffers, and the processing circuitry is configured to separate the Cr component data from the Cb component data and to write the Cr component data to the first buffer while writing the Cb component data to the second buffer.

Additionally or alternatively, when the interleaved pixel components include more than eight bits per component, the processing circuitry can be configured to justify at least the luminance data in the memory so that the luminance data with respect to successive pixels in the sequence are byte-aligned in the luminance buffer.

There is also provided, in accordance with an embodiment of the invention, apparatus for data communications, including a host interface, which is configured to be connected to a bus of a host computer having a processor and a memory. Processing circuitry, which is coupled to the host interface, is configured to receive video data with respect to a sequence of pixels, the video data including data words of more than eight bits per pixel for at least one pixel component of the pixels, and to write the video data, via the host interface, to at least one buffer in the memory while justifying the video data in the memory so that the successive pixels in the sequence are byte-aligned in the at least one buffer.

In some embodiments, the processing circuitry is configured to separate the data words into respective most significant bytes and remainders, and to justify the video data by writing the most significant bytes from the successive pixels to successive bytes in the buffer. In a disclosed embodiment, the processing circuitry is configured to separate the video data into subsequences including a predefined number of pixels in each subsequence, and to write the most significant bytes from the successive pixels in each subsequence to the predefined number of the successive bytes in the buffer, while grouping the remainders from the pixels in the subsequence into one or more further bytes in the buffer.

In an example embodiment, the data words include twelve bits per pixel component, and wherein the predefined number is four, and the processing circuitry is configured to separate each of the remainders into two most significant bits and two least significant bits, and to write the two most significant bits from all the remainders in each subsequence to a first one of the further bytes, while writing the two least significant bits from all the remainders in the subsequence to a second one of the further bytes.

Additionally or alternatively, the processing circuitry is configured to drop at least a predefined portion of the bits in the remainders without writing the predefined portion of the bits to the memory.

Further additionally or alternatively, when the video data include luminance data and chrominance data with respect to the sequence of pixels, the processing circuitry can be configured to write the luminance data and the chrominance data to separate, respective buffers in the memory while justifying the video data so that both the luminance data and the chrominance data are byte-aligned in the respective buffers.

There is additionally provided, in accordance with an embodiment of the invention, a method for data communications, which includes receiving in a peripheral device of a host computer video data including interleaved pixel components of luminance data and chrominance data with respect to a sequence of pixels. The peripheral device separates the luminance data from the chrominance data, and writes the luminance data to a luminance buffer in a memory of the host computer while writing the chrominance data to at least one chrominance buffer in the memory, separate from the luminance buffer.

There is further provided, in accordance with an embodiment of the invention, a method for data communications, which includes receiving in a peripheral device of a host computer video data with respect to a sequence of pixels, the video data including data words of more than eight bits per pixel for at least one pixel component of the pixels. The peripheral device writes the video data to at least one buffer in a memory of the host computer while justifying the video data in the memory so that the successive pixels in the sequence are byte-aligned in the at least one buffer.

The present invention will be more fully understood from the following detailed description of the embodiments thereof, taken together with the drawings in which:

BRIEF DESCRIPTION OF THE DRAWINGS

FIG. 3 is a block diagram that schematically illustrates a stream of video data; and FIGS. 4A and 4B are block diagrams that schematically illustrate data buffers to which video data are written by a peripheral device, in accordance with an embodiment of the invention.

DETAILED DESCRIPTION OF EMBODIMENTS

Figure 1:
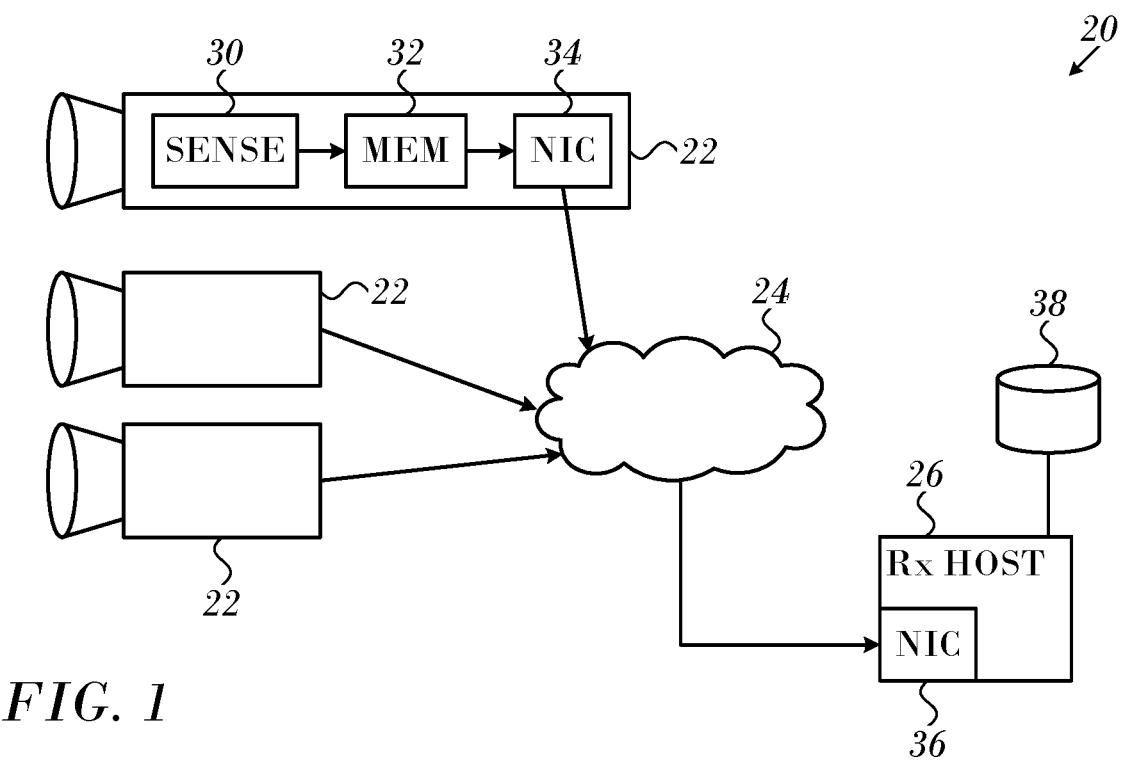
FIG. 1 is block diagram that schematically illustrates a system for video transmission and processing, in accordance with an embodiment of the invention.

The embodiments of the present invention that are described hereinbelow provide novel methods and apparatus for handling of video image data in a host computer, and specifically for storing such data in a computer memory in a manner that enables efficient access to and processing of the data. These methods are advantageously implemented in hardware logic by a peripheral device in the host computer, such as a NIC or a computational accelerator, although software-based implementations are also possible. In some of the disclosed embodiments, the data values of successive pixels in a video image are byte-aligned in a buffer in the computer memory.

In the context of the present description and in the claims, the term "byte-aligned" is used strictly to refer to storage of data, and more specifically video image data, in a memory. As is known in the art, each video image frame is divided into a matrix of pixels, which are arranged successively along rows and columns of the matrix. (The terms "video image data" and "video data" are used interchangeably in the context of the present description and in the claims to refer to this sort of pixel-based representation of images.) The intensity and color components of each pixel in the matrix (referred to collectively as "pixel components") are represented by one or more data words. Examples of these intensity and color components include Y and C luminance and chrominance components, as well as red, green and blue "RGB" color intensity components. When these data words comprise more than eight bits per word, each data word can be divided into a most significant byte (MSB), containing the eight highest bits of the word, and a remainder, containing the remaining, less significant bits.

Computer memory is conventionally configured as a sequence of bytes, each having a successive address in the memory. The term "byte-aligned" is used in the context of the present description and in the claims to mean that the MSB of each of the data words representing the pixel components of each pixel in a given video image is stored entirely in one corresponding byte of the memory. The term "justifying" in reference to the video data means storing the video data in a buffer (i.e., in an assigned block of bytes in the memory) such that the MSBs of the pixel components of successive pixels in the image are byte-aligned in corresponding successive bytes of the buffer, at successive byte addresses. The remainders may be stored elsewhere in the memory or, in some cases, discarded. Pixel chrominance data may be separately byte-aligned in this fashion.

High-speed video streaming protocols, such as those mentioned above in the Background section, typically specify pixel data layouts in the packet payloads that conveniently support capture and streaming of digital images by camera hardware. Since such cameras commonly output interleaved digital luminance and chrominance values per pixel, the transmitted packets likewise contain luminance and chrominance data words in an interleaved format. The lengths of the data within a packet can vary among different standards and applications, but most commonly are 10 or 12 bits. It thus follows that data in the packet payloads are not byte-aligned, since the pixel components spread across byte boundaries. A given byte in the packet payload may contain, for example, two least significant bits of a 10-bit luminance component followed by the six most significant bits of the next chrominance component.

Although this format is widely used by camera manufacturers, it creates serious problems for host computers that are required to receive and process the data: Since luminance and chrominance are typically processed separately (for purposes of image enhancement, compression, and video encoding, for example), the receiving computer must first separate out the interleaved luminance and chrominance data and save them in separate buffers before processing the data. This need for rebuffering sets an upper limit on the rate at which a given computer (even a powerful computer) can accept a stream of video data and, in consequence, places a limit on the maximum output bandwidth of the cameras that collect and transmit the data.

Embodiments of the present invention that are described herein address these problems by offloading the steps of parsing and buffering incoming video data from the receiving host computer to a peripheral device, such as the network interface controller (NIC) that connects the computer to the network or a dedicated computational accelerator. The peripheral device receives video data, for example data delivered in packets from the network or data decompressed by a processor (such as the host CPU) and written to the host memory. (The term "receives," in the context of the present description and in the claims, includes both cases in which the video data are delivered to the peripheral device and cases in which the peripheral device actively fetches the data from some location, such as a memory.) The peripheral device writes the data to buffers in the host memory by direct memory access (DMA), while hardware logic in the peripheral device rearranges the bits of video data on the fly using so as to place the data in the buffer in a format that is ready for processing by the host software. For example, the data may be rearranged in a format that enables host software to take advantage of the instruction set of the host processor, such as MMX™ instructions that enable Intel® Xeon® and other processors to operate on multiple successive bytes of data in the same clock cycle.

In some embodiments, the peripheral device separates the luminance data from the chrominance data in each packet and writes the luminance data to a luminance buffer in the host memory while writing the chrominance data to one or more chrominance buffers, separate from the luminance buffer. The chrominance data may all be written to the same buffer or, alternatively, the peripheral device may separate the Cr component data from the Cb component data and write each of these two chrominance components to its own buffer.

Additionally or alternatively, the peripheral device justifies the video data in the memory so that successive pixels in the sequence are byte-aligned in the buffer (or buffers, in the case of separate luminance and chrominance buffers), even when the data words are more than eight bits long. For this purpose, in some embodiments, the peripheral device separates each word of video data (luminance, chrominance, or both) into a most significant byte and a remainder. It then justifies the video data by writing the most significant bytes from successive components within a group of pixels to successive bytes in the buffer, while saving the remainders elsewhere. For example, the peripheral device may separate the video data into subsequences, each comprising a group of a predefined number of pixels, and then write the most significant bytes from the pixel components of the successive pixels in each subsequence to a corresponding number of successive bytes in the buffer, while grouping the remainders from the pixels in the subsequence into one or more further bytes in the buffer. In some embodiments, the peripheral device does not write all of the bits of the remainders to the buffer, but may rather drop some of the remainder bits (particularly the chrominance bits) when they are not needed by the host, and thus reduce consumption of bus bandwidth and memory, as well as the processing burden on the CPU.

FIG. 1 is block diagram that schematically illustrates a system 20 for video transmission over a network 24, in accordance with an embodiment of the invention. One or more video sources, such as cameras 22, capture and transmit color video data over network 24 to a receiving host computer (Rx HOST) 26. For this purpose, each camera 22 typically comprises an image sensor 30, which captures and digitizes a sequence of video frames and writes luminance and chrominance data to a buffer 32 in pixel order. A transmitting NIC 34 packetizes and transmits the data at the acquisition rate in a standard packet format, such as RTP packets in accordance with one of the formats cited above in the Background section. An example format of this sort is shown below in FIG. 3. Alternatively or additionally, computer 26 may receive streams of input video data from other sources.

Figure 2:
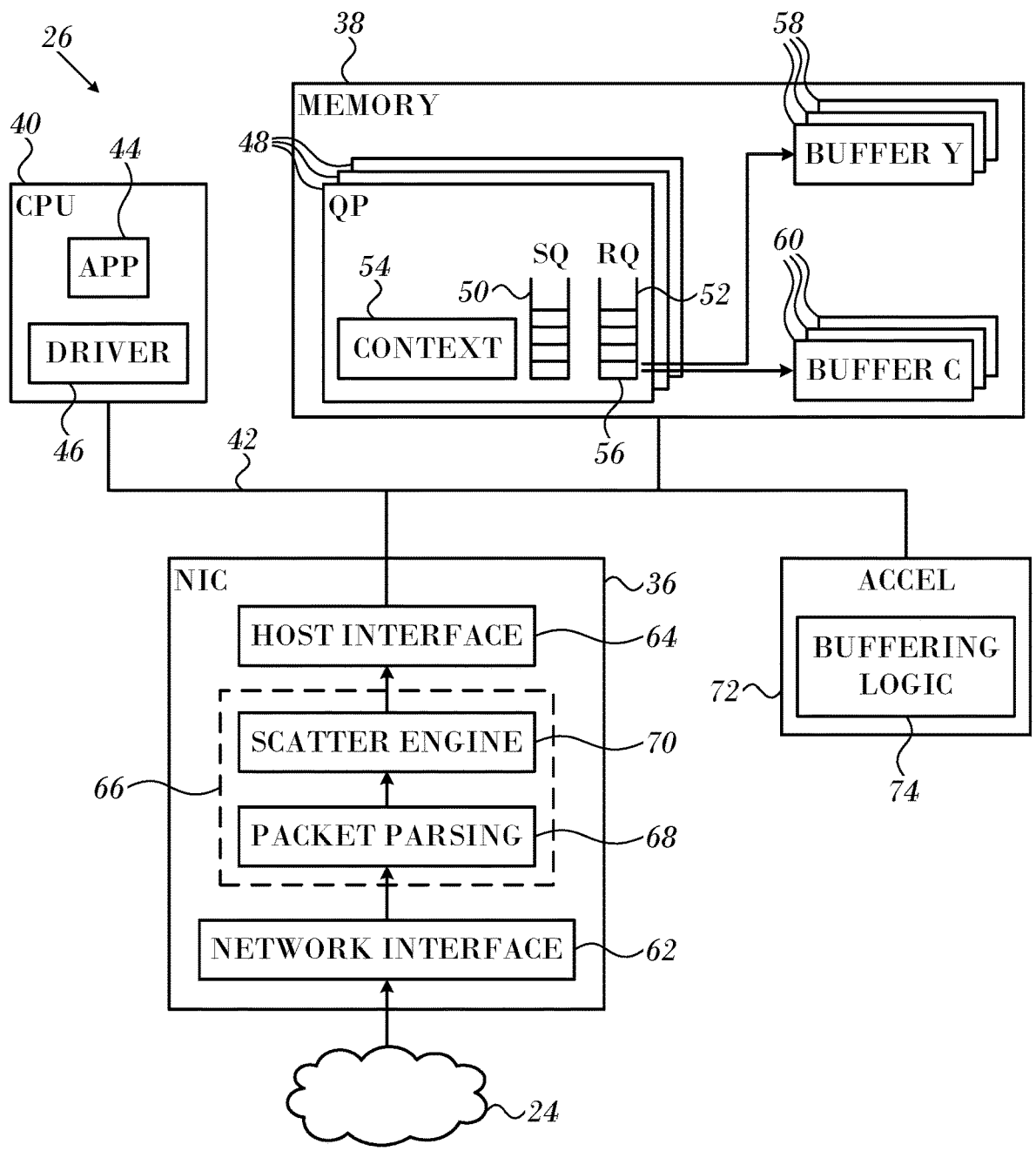
FIG. 2 is a block diagram that schematically shows details of a host computer with a network interface controller (NIC) and a video processing accelerator, in accordance with an embodiment of the invention.

Host computer 26 is connected to network 24 by a receiving NIC 36, which receives the incoming video data packets from cameras 22. As described further hereinbelow, in some embodiments, NIC 36 parses the packets and writes the data to a memory 38 of computer 26, while reordering the data in accordance with instructions received from the host computer. In an alternative embodiment, NIC 36 writes the packet payloads to memory 38, for parsing and reordering by other elements of the host computer 26, such as the CPU and/or a computational accelerator (as shown in FIG. 2). The data may arrive and/or may be stored in memory 38 in compressed form, in which case the CPU or another component of host computer 26 decompresses the data before reordering. Examples of reordered data formats are shown below in FIGS. 4A/B.

FIG. 2 is a block diagram that schematically shows details of host computer 26, including particularly the components of NIC 36 and the data structures in memory 38 that are used in receiving and processing video data, in accordance with an embodiment of the invention. Computer 26 comprises a central processing unit (CPU) 40, which communicates with peripheral devices, such as NIC 36 and a computational accelerator 72, via a bus 42, such as a Peripheral Component Interconnect (PCI) Express® bus.

CPU 40 in the present example runs a video application program 44, which processes video data that are received from network 24 and written by NIC 36 to memory 38. Application program 44 interacts with NIC 36 via a queue pair (QP) 48, which is assigned to the application program by a NIC driver program 46 running on CPU 40. (Typically, driver program 46 establishes multiple QPs to serve both application program 44 and other processes running on computer 26.) QP 48 comprises a send queue (SQ) 50 and a receive queue (RQ) 52, as are known in the art, with a QP context 54 containing metadata including, in the present case, information regarding the expected video packet format and data reordering format for this QP.

In order to receive video data from network 24, application program 44 allocates data buffers 58 and 60 in memory 38 and submits work requests to driver program 46 to receive data into these buffers. In the pictured example, buffers 58 and 60 include separate luminance (Y) buffers 58 and chrominance (C) buffers 60. In response to these work requests, driver program 46 posts work queue elements (WQEs) 56 in receive queue 52, pointing to respective buffers 58 and 60 to which NIC 36 is to write incoming video data.

Upon receiving a video packet or stream of packets over network 24 from one of cameras 22, NIC 36 reads one or more WQEs 56 from receive queue 52 of the appropriate QP 48 and then writes the pixel data, in the format and order indicated by QP context 54, to buffers 58 and 60 indicated by the WQE. NIC 36 performs these data writing and reordering functions by DMA over bus 42, without active involvement by CPU 40 in the actual data transfer. Once NIC 36 has finished writing a certain amount of video data (for example, a packet or group of packets, or possibly an entire frame) to buffers 58 and 60, it writes a completion report to a completion queue (not shown) in memory 38, in order to inform application program 44 that the data are ready for processing.

NIC 36 is connected to bus 42 by a host interface 64 and to network 24 by a network interface 62, which receives data packets containing video data comprising interleaved words of luminance data and chrominance data (as illustrated in FIG. 3). Packet processing circuitry 66, which is coupled between network interface 62 and host interface 64, both processes incoming packets received from network 24 and generates outgoing packets for transmission to the network. Typically, to maintain high throughput, packet processing circuitry 66 carries out these functions in dedicated hardware logic, although at least some of the processing and control operations of circuitry 66 may alternatively be implemented in software or firmware by an embedded programmable processor. The description that follows will focus on the specific functions of packet processing circuitry 66 that are involved in processing incoming video data packets. Other packet reception and transmission functions of NIC 36 will be familiar to those skilled in the art and are omitted from the present description for the sake of simplicity.

Packet processing circuitry 66 comprises packet parsing logic 68, which reads and analyzes the headers of incoming data packets. Upon receiving an incoming video packet from one of cameras 22, packet parsing logic 68 identifies the QP 48 to which the packet belongs and reads a receive WQE 56 from the appropriate receive queue 52 in order to identifying the buffers 58, 60 to which the packet data should be written. Based on the metadata in QP context 54, packet parsing logic 68 instructs a scatter engine 70 to write the luminance data in the packet payload to the designated luminance buffer 58 and to separately write the chrominance data in the packet payload to chrominance buffer 60.

As explained above, the instructions to scatter engine 70 can involve one or both of de-interleaving the interleaved luminance and chrominance components in the packet payloads, and justifying the video data written to buffers 58 and 60 so that the data with respect to successive pixels are byte-aligned in the buffers. Scatter engine 70 writes the data in the proper order by DMA, thus relieving CPU 40 of any involvement in the tasks of data de-interleaving and justification.

Packet processing circuitry 66 writes the payload data to buffers 58 and 60 in the proper sequential order of the pixels in the transmitted video frames. In some cases, network 24 may be configured to guarantee in-order delivery of the packets to receiving host computer 26, so that no further effort is required by NIC 36 in this regard. Alternatively, some network transport protocols, such as RTP, include packet serial numbers in the packet headers, which can be used by packet processing circuitry 66 in checking and, in some cases, correcting for packets received out of order. Techniques that can be used for this purpose are described, for example, in U.S. Pat. No. 10,516,710, whose disclosure is incorporated herein by reference.

In an alternative embodiment, the tasks of data de-interleaving and/or justification are carried out by processing circuitry in another peripheral device, such as buffering logic 74 in a computational accelerator 72. Buffering logic 74 comprises hardware logic circuits, which perform functions similar to those of scatter engine 70, inter alia, along with an interface to bus 42 (not shown), similar to host interface 64. In an example scenario, CPU 40 decompresses compressed video data and writes the decompressed data to a buffer in memory 38. Buffering logic 74 reads the data in the original order written by the CPU and then re-writes the data, for example to buffers 58 and 60, in de-interleaved and justified form.

Thus, the principles of de-interleaving and justification of video data that are described herein with reference to the functions of NIC 36 may be implemented, as well, in other peripheral components, mutatis mutandis. Although the present description refers, for the sake of clarity and concreteness, specifically to functionalities of NIC 36, the principles of the present invention are equally applicable to accelerator 72 and other suitable peripheral devices.

FIG. 3 is a block diagram that schematically illustrates a typical stream 80 of video data transmitted over network 24 by one of cameras 22. The figure shows only the first six bytes of data in stream 80, which are encapsulated and transmitted in a data packet, possibly as the initial part of a payload that includes a larger volume of pixel data. (These bytes make up a pixel group representing the smallest number of pixels that can be grouped together in byte-aligned memory, and are typically transmitted in the packet payload together with additional pixel groups.) Stream 80 comprises interleaved data words 82, 84 of chrominance data (Cb, Cr) and luminance data (Y), belonging to successive pixel components in a given frame. Each word 82, 84 in this example comprises twelve bits, ordered from the most significant bit (#11) to the least significant (#0). This particular format, along with the corresponding reordered buffer formats that are illustrated in the figures that follow, is shown only by way of example, however, and the principles of the present invention may similarly be applied, mutatis mutandis, to other color video formats that are known in the art.

FIGS. 4A and 4B are block diagrams that schematically illustrate the contents of data buffers 58, 60, respectively, to which video data have been written by NIC 36 in accordance with an embodiment of the invention. As shown in these figures, packet processing circuitry 66 separates data words 82, 84 of the incoming data packets into luminance and chrominance components and writes these components respectively to buffer 58 (FIG. 4A) and buffer 60 (FIG. 4B). Packet processing circuitry 66 further separates each luminance word 84 into a respective most significant byte 90, comprising bit #11 through bit #4 in the present example, and a remainder, comprising bit #3 through bit #0. Circuitry 66 similarly separates out most significant bytes 100 of the successive Cb and Cr chrominance words from the corresponding remainders.

Packet processing circuitry 66 justifies the video data by writing most significant bytes 90 and 100 from successive pixels to successive bytes in the corresponding buffers 58 and 60, as illustrated by the first four bytes in each of FIGS. 4A and 4B. To enable efficient processing by CPU 40, it can be useful, as explained above, to write the most significant bytes of a certain number of consecutive pixels to consecutive respective locations in buffers 58 and 60, while the remainders are written to other locations (or possibly even discarded). For this purpose, packet processing circuitry 66 separates the video data into subsequences, each comprising a predefined number of pixels, for example, four consecutive pixels per subsequence, and writes most significant bytes 90, 100 from the successive pixels in each subsequence to the corresponding number of successive bytes in buffer 58 or 60.

In the present example, packet processing circuitry 66 groups the remainders from the pixels in the four-pixel subsequence into remainder bytes 92 and 96 in luminance buffer 58 and remainder bytes 102 and 104 in chrominance buffer 60. In this particular example, in which data words 82 and 84 each comprise twelve bits and the pixels are grouped in subsequences of four pixels, it can be useful to separate each of the remainders into two most significant bits 94 and two least significant bits 98. (For the sake of simplicity, these bits 94 and 98 are labeled only in FIG. 4A.) The two most significant bits 94 from all four remainders in the subsequence are written to byte 92, while the two least significant bits 98 from all four remainders in the subsequence are written to byte 96. This ordering scheme allows application 44 to truncate twelve-bit input data to ten or eight bits simply by skipping over bytes 92 and 96. Input data words of other lengths, for example ten or sixteen bits, can be buffered in similar fashion, with smaller or larger numbers of remainder bytes.

Alternatively, if QP context 54 indicates that the remainders of the incoming data words are not needed, packet processing circuitry 66 can itself drop all or a part of the remainders and write only the most significant bytes of the video data words, in sequential order, to buffers 58 and 60, possibly with some of the remainder bits. For example, if only ten bits of color depth are required, rather than twelve, packet processing circuitry 66 can write remainder bytes 102 but not remainder bytes 104 to buffer 60.

Although NIC 36 in the embodiments described above both separates incoming video data into luminance and chrominance components and justifies these components in buffers 58 and 60, NIC 36 may alternatively perform only one of these functions (component separation or justification), or may apply such functions only to a certain part of the video data. Furthermore, although the example embodiments described above all relate to handling of luminance and chrominance video components, the principles of the present invention (and specifically the techniques of data justification described above) may alternatively be applied, mutatis mutandis, to other video component schemes, such as RGB schemes. In the RGB example, each color component of the R, G and B may be written to a separate buffer and/or justified in the memory so that data associated with a certain color component of successive pixels in the video data sequence are byte-aligned in a corresponding buffer. All such alternative applications of the apparatus and methods described above are considered to be within the scope of the present invention.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Apparatus for data communications, comprising:
a host interface, which is configured to be connected to a bus of a host computer having a processor and a memory; and
processing circuitry, which is coupled to the host interface and is configured to receive video data with respect to a sequence of pixels, the video data comprising data words of more than eight bits per pixel for at least one pixel component of the pixels, and to write the video data, via the host interface, to at least one buffer in the memory while justifying the video data in the memory so that the successive pixels in the sequence are byte-aligned in the at least one buffer,
wherein the processing circuitry is configured to separate the data words into respective most significant bytes and remainders, and to justify the video data by writing the most significant bytes from the successive pixels to immediately successive bytes in the buffer.

2. The apparatus according to claim 1, and comprising a network interface, which is configured to receive from a packet communication network data packets containing the video data.

3. The apparatus according to claim 1, wherein the processing circuitry is configured to separate the video data into subsequences comprising a predefined number of pixels in each subsequence, and to write the most significant bytes from the successive pixels in each subsequence to the predefined number of the successive bytes in the buffer, while grouping the remainders from the pixels in the subsequence into one or more further bytes in the buffer.

4. The apparatus according to claim 3, wherein the data words comprise twelve bits per pixel component, and wherein the predefined number is four, and
wherein the processing circuitry is configured to separate each of the remainders into two most significant bits and two least significant bits, and to write the two most significant bits from all the remainders in each subsequence to a first one of the further bytes, while writing the two least significant bits from all the remainders in the subsequence to a second one of the further bytes.

5. The apparatus according to claim 1, wherein the processing circuitry is configured to drop at least a predefined portion of the bits in the remainders without writing the predefined portion of the bits to the memory.

6. A method for data communications, comprising:
receiving in a peripheral device of a host computer video data with respect to a sequence of pixels, the video data comprising data words of more than eight bits per pixel for at least one pixel component of the pixels; and
writing the video data from the peripheral device to at least one buffer in a memory of the host computer while justifying the video data in the memory so that the successive pixels in the sequence are byte-aligned in the at least one buffer,
wherein justifying the video data comprises separating the data words into respective most significant bytes and remainders, and writing the most significant bytes from the successive pixels to immediately successive bytes in the buffer.

7. The method according to claim 6, wherein receiving the video data comprises receiving data packets containing the video data from a packet communication network.

8. The method according to claim 6, wherein writing the video data comprises separating the video data into subsequences comprising a predefined number of pixels in each subsequence, and writing the most significant bytes from the successive pixels in each subsequence to the predefined number of the successive bytes in the buffer, while grouping the remainders from the pixels in the subsequence into one or more further bytes in the buffer.

9. The method according to claim 8, wherein the data words comprise twelve bits per pixel component, and wherein the predefined number is four, and
wherein separating the video data comprises separating each of the remainders into two most significant bits and two least significant bits, and writing the two most significant bits from all the remainders in each subsequence to a first one of the further bytes, while writing the two least significant bits from all the remainders in the subsequence to a second one of the further bytes.

10. The method according to claim 6, wherein separating the data words comprises dropping, by the peripheral device, at least a predefined portion of the bits in the remainders without writing the predefined portion of the bits to the memory.

\* \* \* \* \*